(12) United States Patent
Huang et al.

(10) Patent No.: US 11,106,190 B2
(45) Date of Patent: Aug. 31, 2021

(54) SYSTEM AND METHOD FOR PREDICTING REMAINING LIFETIME OF A COMPONENT OF EQUIPMENT

(71) Applicant: INDUSTRIAL TECHNOLOGY RESEARCH INSTITUTE, Hsinchu (TW)

(72) Inventors: Po-Yu Huang, Tainan (TW); Chuang-Hua Chueh, Taipei (TW); Jia-Min Ren, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1043 days.

(21) Appl. No.: 15/602,697

(22) Filed: May 23, 2017

(65) Prior Publication Data

US 2018/0165592 A1    Jun. 14, 2018

(30) Foreign Application Priority Data

Dec. 13, 2016  (TW) .................................. 105141245

(51) Int. Cl.
   *G06N 20/00*   (2019.01)
   *G05B 19/4065*   (2006.01)
   *G05B 23/02*   (2006.01)

(52) U.S. Cl.
   CPC ..... *G05B 19/4065* (2013.01); *G05B 23/0283* (2013.01); *G06N 20/00* (2019.01)

(58) Field of Classification Search
   CPC .................................................. G05B 23/0283
   See application file for complete search history.

(56) References Cited

U.S. PATENT DOCUMENTS 8,548,750 B1 * 10/2013 Garvey ................... G07C 3/08
                                                               702/34
8,725,456 B1    5/2014 Saha et al.
(Continued)

FOREIGN PATENT DOCUMENTS

CN    104166787 A    11/2014
CN    105445004 A     3/2016
(Continued)

OTHER PUBLICATIONS

Kim, Hack-Eun "Machine Prognostics based on Health State Probability Estimation" Queensland University of Technology Ph.D. Thesis [Published 2010] [Retrieved Jun. 2020] <URL:https://eprints.qut.edu.au/41739/1/Hack-Eun_Kim_Thesis.pdf> (Year: 2010).*
(Continued)

*Primary Examiner* — Michael J Huntley
*Assistant Examiner* — Fen Christopher Tamulonis
(74) *Attorney, Agent, or Firm* — Muncy, Geissler, Olds & Lowe, P.C.

(57) ABSTRACT

A system and method for predicting remaining lifetime of a component of equipment is provided. The prediction system includes a data module, a feature module, a current data-based prediction module, a historical data-based prediction module, and a confidence module. The data module obtains a test sensor data of the component of equipment. The feature module obtains a historical health indicator and the current-health indicator. The current data-based prediction module obtains a first predicted remaining lifetime and a first prediction confidence according to the current-health indicator. The historical data-based prediction module obtains a second predicted remaining lifetime and a second prediction confidence according to the historical health indicator. The confidence module generates a final predicted remaining lifetime of the component of equipment accord-
(Continued)

ing to the first predicted remaining lifetime, the second predicted remaining lifetime, the first prediction confidence and the second prediction confidence.

20 Claims, 5 Drawing Sheets

(56) References Cited

U.S. PATENT DOCUMENTS

| | | | |
|---|---|---|---|
| 8,849,586 B1 | 9/2014 | Garvey | |
| 8,903,750 B1* | 12/2014 | Bodkin | G06N 20/00 |
| | | | 706/14 |
| 2003/0065548 A1 | 4/2003 | Schmidt | |
| 2003/0184307 A1* | 10/2003 | Kozlowski | G01R 31/367 |
| | | | 324/427 |
| 2008/0140361 A1* | 6/2008 | Bonissone | G06N 5/04 |
| | | | 703/2 |
| 2008/0140362 A1 | 6/2008 | Gross | |
| 2010/0205039 A1 | 8/2010 | Basak et al. | |
| 2011/0246093 A1* | 10/2011 | Wood | G06F 11/008 |
| | | | 702/34 |
| 2012/0130760 A1 | 5/2012 | Shan et al. | |
| 2012/0143564 A1* | 6/2012 | Li | G05B 23/0283 |
| | | | 702/179 |
| 2014/0365190 A1* | 12/2014 | Mahate | G06F 8/34 |
| | | | 703/7 |

FOREIGN PATENT DOCUMENTS

| | | |
|---|---|---|
| CN | 105512483 A | 4/2016 |
| CN | 105808957 A | 7/2016 |
| TW | 200939055 A | 9/2009 |
| TW | 201102839 A | 1/2011 |
| TW | I463334 B | 12/2014 |
| TW | I549075 B | 9/2016 |

OTHER PUBLICATIONS

Tianyi Wang et al.; "A Similarity-Based Prognostics Approach for Remaining Useful Life Estimation of Engineered Systems"; International Conference on Prognostis and Health Managmeent; 2008; pp. 1-6; IEEE.

J. Lee et al.; "Development of a Predictive and Preventive Maintenance Demonstration System for a Semiconductor Etching Tool"; 2013; pp. 913-927; vol. 52; ECS Transactions.

\* cited by examiner

SYSTEM AND METHOD FOR PREDICTING REMAINING LIFETIME OF A COMPONENT OF EQUIPMENT

This application claims the benefit of Taiwan application Serial No. 105141245, filed Dec. 13, 2016, the disclosure of which is incorporated by reference herein in its entirety.

TECHNICAL FIELD

The disclosure relates in general to a system and method for predicting the remaining lifetime of a component of equipment.

BACKGROUND

Manufacturing will be one of the top 5 big data markets in 2020, in which the market share of manufacturing is about 10%. According to one report, the failure of the important equipment is the main factor that influences the operation of a company. If one can analyze the failure of the important equipment, the operation efficiency can be improved and the competitiveness of enterprises can be greatly increased.

Prognostics and health management can be used to monitor the health state of equipment and its components and then decide the time to maintain or replace the equipment and its components by the health state of the equipment and its components. In this way, prognostics and health management can help industries to reduce unscheduled downtime so as to increase the uptime of the equipment. Therefore, how to accurately predict the remaining lifetime of a component of equipment has become an important task for industries.

SUMMARY

The disclosure is directed to a system for predicting the remaining lifetime of a component of equipment and the prediction method. The prediction method of the present disclosure uses both the aging trend of the current data and the historical failure data and determines the final predicted remaining lifetime through dynamic allocation, hence effectively increasing the prediction result. The present disclosure can determine the best timing for maintaining or replacing the component of equipment and therefore reduces both unexpected downtime and maintenance frequency of equipment.

According to one embodiment, a system for predicting the remaining lifetime of a component of equipment is provided. The system includes a data module, a feature module, a current data-based prediction module, a historical data-based prediction module and a confidence module. The data module obtains a test sensor data of a component of equipment. The feature module obtains a historical health indicator according to historical failure data of the component of equipment, and obtains a current-health indicator according to the test sensor data. The current data-based prediction module obtains a current-health indicator function according to the current-health indicator, obtains a first predicted remaining lifetime according to the current-health indicator function, and obtains a first prediction confidence. The historical data-based prediction module obtains a historical health indicator model, including at least one historical health indicator function, according to the historical health indicator. A second predicted remaining lifetime is obtained according to the historical health indicator model and the current-health indicator function. A second prediction confidence is obtained according to the relationship between the historical health indicator model and the current-health indicator function. The confidence module generates a final predicted remaining lifetime of the component of equipment according to the first predicted remaining lifetime, the second predicted remaining lifetime, the first prediction confidence and the second prediction confidence. At least one of the data module, the feature module, the current data-based prediction module, the historical data-based prediction module, and the confidence module is implemented by at least one circuit or a processor performing a program.

According to another embodiment, a method for predicting a remaining lifetime of a component of equipment is provided. The method includes following steps. Firstly, test sensor data of the component of equipment is obtained. Then, a historical health indicator is obtained according to historical failure data of the component of equipment, and a current-health indicator is obtained according to the test sensor data. Then, a current-health indicator function is obtained according to the current-health indicator, and a first predicted remaining lifetime and a first prediction confidence are obtained according to the current-health indicator function. Then, a historical health indicator model, including at least one historical health indicator function, is obtained according to the historical health indicator, a second predicted remaining lifetime is obtained according to the historical health indicator model and the current-health indicator function, and a second prediction confidence is obtained according to the relationship between the historical health indicator model and the current-health indicator function. Finally, a predicted remaining lifetime of the component of equipment is generated according to the first predicted remaining lifetime, the second predicted remaining lifetime, the first prediction confidence and the second prediction confidence.

The above and other aspects of the invention will become better understood with regard to the following detailed description of the preferred but non-limiting embodiment(s). The following description is made with reference to the accompanying drawings.

Figure 1:
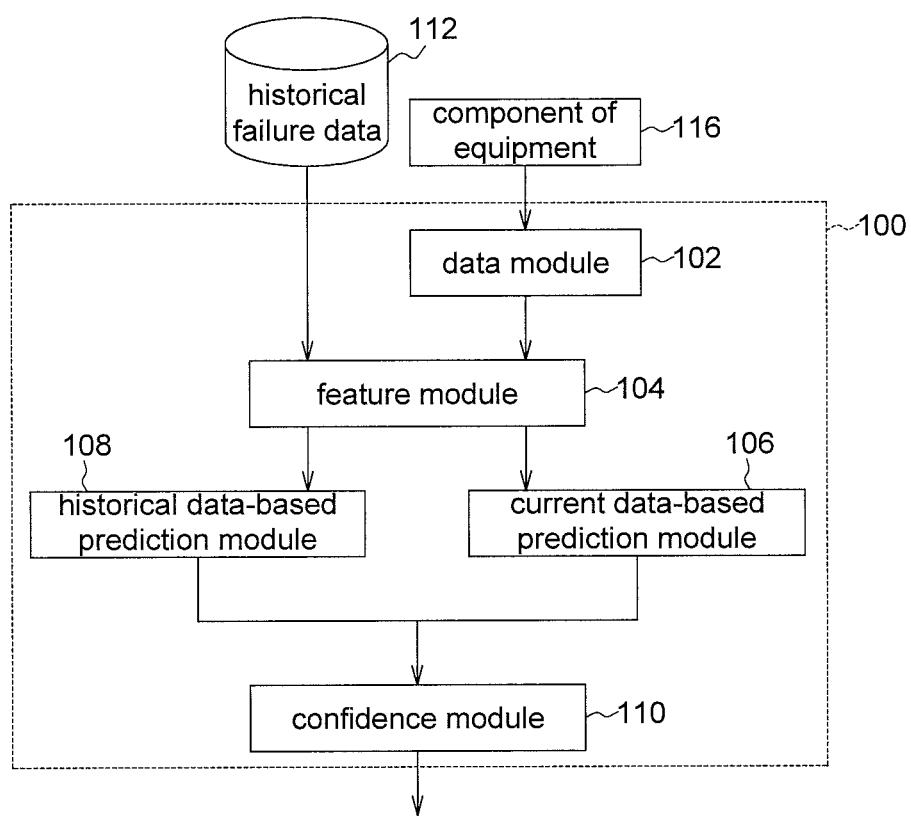
FIG. 1 is a block diagram of a system for predicting the remaining lifetime of a component of equipment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a block diagram of a system for predicting the remaining lifetime of a component of equipment is shown. The prediction system 100 includes a data module 102, a feature module 104, a current data-based prediction module 106, a historical data-based prediction module 108 and a confidence module 110.

The data module 102 obtains test sensor data of a component of equipment 116. The feature module 104 obtains a historical health indicator according to a historical failure data of the component of equipment, and obtains a current-health indicator according to the test sensor data. The current data-based prediction module 106 obtains a current-health indicator function according to the current-health indicator, and obtains a first predicted remaining lifetime and a first prediction confidence according to the current-health indicator function.

The historical data-based prediction module 108 obtains a historical health indicator model, including one historical health indicator function, according to the historical health indicator, obtains a second predicted remaining lifetime according to the historical health indicator model and the current-health indicator function, and obtains a second prediction confidence according to the relationship between the historical health indicator model and the current-health indicator function.

The confidence module 110 generates a final predicted remaining lifetime of the component of equipment according to the first predicted remaining lifetime, the second predicted remaining lifetime, the first prediction confidence and the second prediction confidence. At least one of the data module 102, the feature module 104, the current data-based prediction module 106, the historical data-based prediction module 108, and the confidence module 110 is implemented by at least one circuit or a processor performing a program. Detailed descriptions of the prediction system 100 are provided below.

Figure 2:
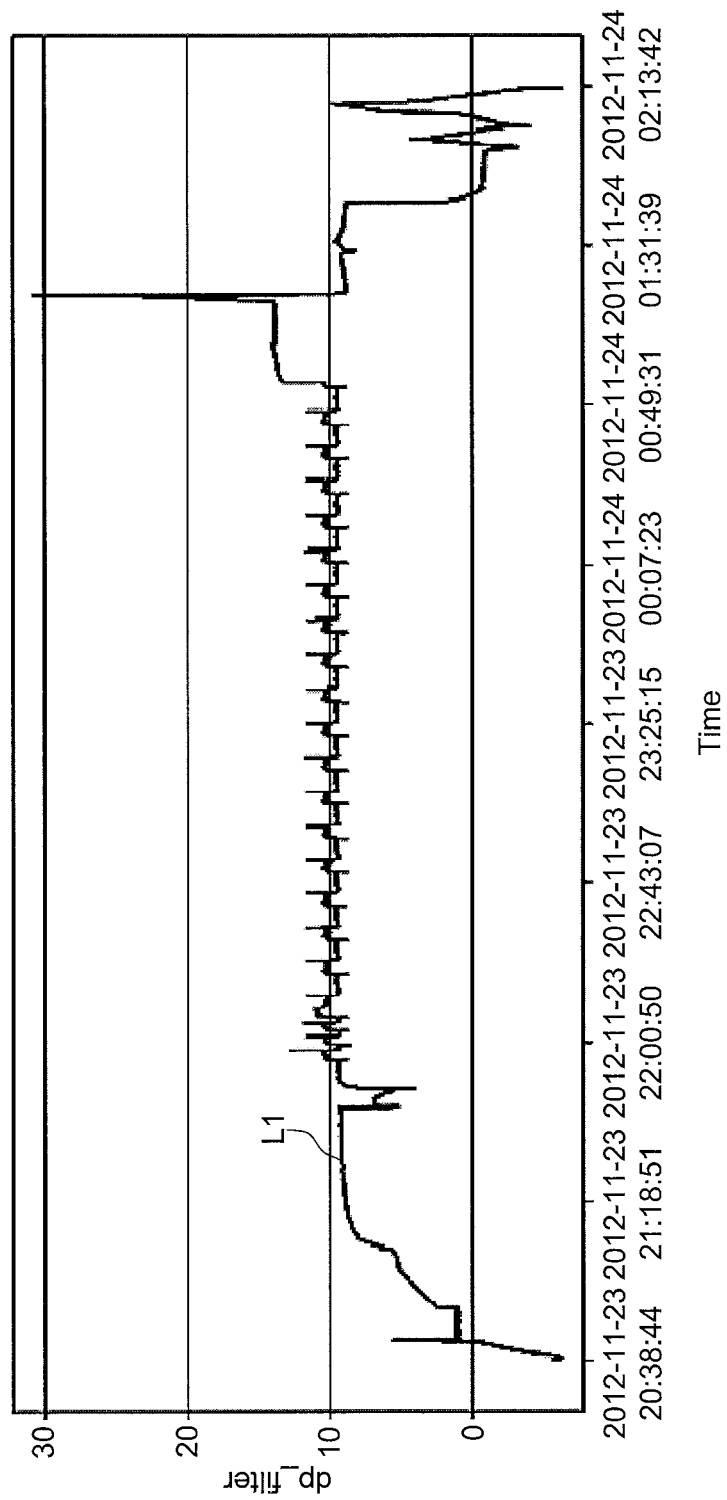
FIG. 2 is a schematic diagram of a sensor data of the sensor of a particle filter of an MOCVD equipment accessed from a database during a run.

The data module 102 obtains the test sensor data of the component of equipment by reading file, using a data access card interface, or by accessing a database. Let the sensor data obtained by the sensor of the particle filter of the Metal Organic Chemical Vapor Deposition (MOCVD) equipment be taken for example. Referring to FIG. 2, a schematic diagram of a sensor data dp_filter of a sensor of a particle filter of an MOCVD equipment accessed from a database during a run is shown. The curve L1 is the sensor data dp_filter collected during a complete run of the particle filter. When the maximum value of the sensor data during the run exceeds a threshold (such as 30), this indicates that the particle filter needs to be replaced. A run can be defined as a period required for the equipment to complete a manufacturing process of a product. If the product is a Light-Emitting Diode (LED), then a run is defined as a process time required for manufacturing the LED.

Figure 3:
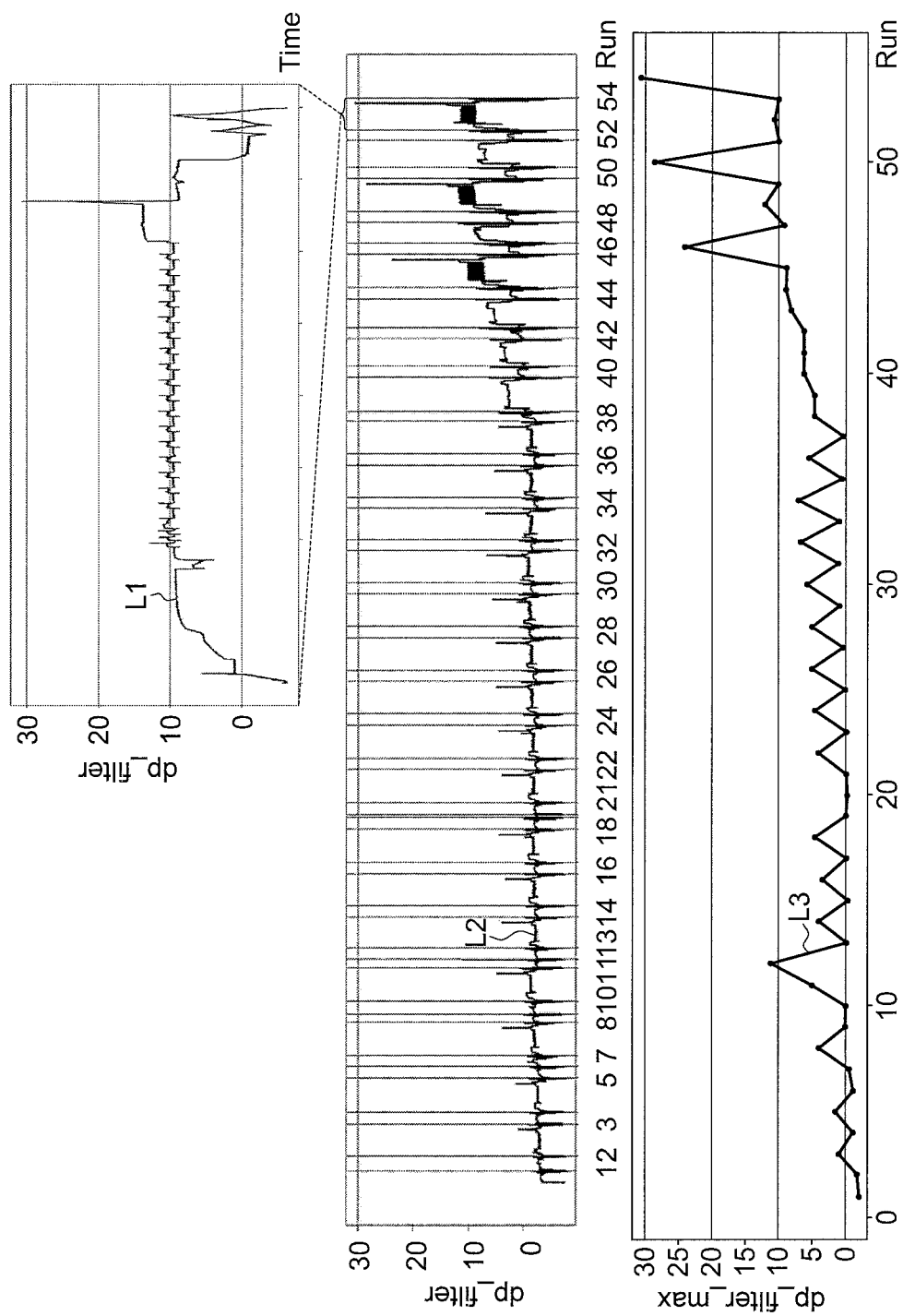
FIG. 3 is a feature sequence diagram of a sensor data of a sensor of a particle filter of an MOCVD equipment during each run in a life cycle.

Next, the way by which the feature module 104 obtains the current-health indicator according to the test sensor data is exemplified by the sensor data dp_filter of the sensor in the particle filter of the MOCVD equipment. Referring to FIG. 3, a feature sequence diagram of a sensor data dp_filter of a sensor in a particle filter of an MOCVD equipment during each run of a life cycle. One life cycle can be defined as a period starting from the time when the component of equipment is used and ending at the time when the component of equipment is broken. A life cycle has a number of runs. The curve L1 corresponds to the sensor data dp_filter collected during a complete run of the particle filter of FIG. 2. The curve L2 corresponds to the sensor data collected during a life cycle starting from the time when the particle filter is renewed and ending at the time when the particle filter is broken and needs to be replaced. The curve L3 is the maximum value of the sensor data (designated by dp_filter_max) collected during each run. For example, the dp_filter_max collected during a run can be defined as the value of the health indicator of the run. However, the present embodiment is not limited thereto. In the present embodiment, a value other than dp_filter_max collected during a run can also be defined as the value of the health indicator of the run. For example, statistics, such as the maximum value, the average value, and the difference between the maximum value and the minimum value, of the sensor data (such as the LED crystal growth layer) collected at a specific interval during a run can be used as the value of the health indicator of the run. In another embodiment, the difference between the maximum value of the sensor data collected during a run and the maximum value of the sensor data generated in the previous run is used as the value of the health indicator during the run or other value capable of reflecting the health state of the component of equipment can be used as the value of the health indicator of the run.

The failure prediction of the particle filter of the MOCVD equipment is to predict in which run will the value of the predicted health indicator corresponding to the particle filter exceed the said threshold in the future. If the value of the predicted health indicator exceeds the said threshold, this indicates that the particle filter may be broken and therefore needs to be replaced. Or, the failure prediction can predict in which run will the value of the predicted health indicator corresponding to the particle filter exceed the said threshold, and the particle filter will possibly be broken during that run and therefore needs to be replaced.

The way by which the feature module 104 obtains a historical health indicator according to the historical failure data of the component of equipment is similar to the way by which the feature module 104 obtains the current-health indicator according to the test sensor data. The difference lies in that the feature module 104 will substitute the historical failure data 112 of the component of equipment for the test sensor data mentioned above to obtain the historical health indicator. The historical failure data 112 of the component of equipment can be the historical sensor data of a number of life cycles (such as a number of training cycles) of the component of equipment. The historical sensor data of each life cycle can be the feature sequence illustrated in the curve L2 of FIG. 3. The feature module 104 can obtain the historical health indicators similar to that illustrated in the curve L3 of FIG. 3 according to the historical sensor data of the life cycles.

Although the above description is exemplified by the particle filter of the MOCVD equipment, the present disclosure is also applicable to other types of equipment as well as the components of other types of equipment. Apart from using the sensor data of the sensor to obtain the value of the health indicator, other feature parameters of the component of equipment, such as the feature parameter reflecting the lifespan or health state of the component of equipment can also be used to obtain the value of the health indicator. Apart from using the maximum value of the sensor data collected during each run as the value of the health indicator, the value of the health indicator can also be obtained by other ways as long as the value of the health indicator is obtained from the sensor data is capable of reflecting the health state of the component of equipment.

Then, the way by which the current data-based prediction module 106 obtains the current-health indicator function according to the test sensor data is exemplified below. The current data-based prediction module 106 predicts the first predicted remaining lifetime and calculates the first prediction confidence according to the change in health indicator calculated from the test sensor data. The current data-based prediction module 106 obtains the current-health indicator function by using a regression model, for example, according to the test sensor data, and a regression error corresponding to the regression model can be used as the first prediction confidence.

Figure 4:
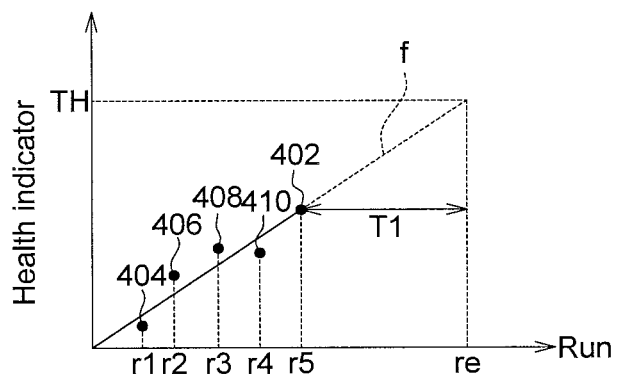
FIG. 4 is an example of obtaining a current-health indicator function.

Referring to FIG. 4, an example of obtaining a current-health indicator function is shown. The data range of the current-health indicator is the current-health indicator of the current run (the run r5 corresponding to the time point t1) and previous runs (prior to the run r5 corresponding to the time point t1) of the test cycle, such as the current-health indicators 404, 406, 408, 410 and 402 of the runs r1, r2, r3, r4, and r5 respectively. The curve Yc is formed by fitting the values of the current-health indicator, and $Y_c = f(X_c)$. Xc denotes the run indexes (for example, the runs r1~r5 and re); Yc denotes the fitted current-health indicator; f denotes the current-health indicator function.

The current-health indicator function f is used to predict a time point at which a predicted health indicator will exceed a threshold. The predicted time point is a failure time point of the component of equipment, and the difference between the failure time point and the current time point is the first predicted remaining lifetime.

For example, assume the threshold TH be 30. The values of the current-health indicator prior to the current run r5 (corresponding to the time point t1) are (6.8, 9.0, 11.0, 13.1, 14.6). Thus, the current-health indicator function f can be obtained as $Y_c = f(X_c) = 4.99 + 1.97 X_c$. The first predicted remaining lifetime is the time difference T1 (T1=t2−t1) between the time (corresponding to the time point t2) of the run re at which Yc reaches the threshold TH and the time (corresponding to the time point t1) of the current run r5. The first prediction confidence can be obtained according to the goodness of fit between the current-health indicator function f and the current-health indicators (6.8, 9.0, 11.0, 13.1, and 14.6). For example, the first prediction confidence can be obtained according to the regression error corresponding to the current-health indicator function f and the current-health indicators (6.8, 9.0, 11.0, 13.1, and 14.6).

Figure 5:
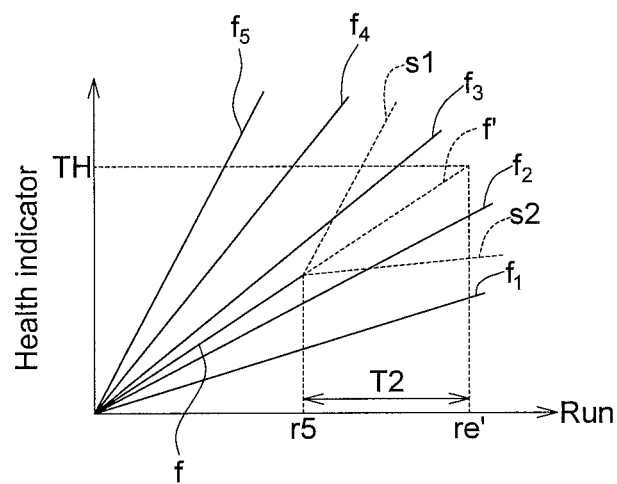
FIG. 5 is an example of obtaining a historical health indicator model.

The way by which the historical data-based prediction module obtains the historical health indicator model according to the historical health indicator, and obtains the second predicted remaining lifetime and the second prediction confidence is exemplified below. Referring to FIG. 5, an example of obtaining a historical health indicator model is shown. The historical failure data includes the sensor data of at least one training cycle, wherein the sensor data of each training cycle corresponds to a historical health indicator function, such as historical health indicator functions f1~f5. A number of historical health indicator functions, such as f1~f5, form the historical health indicator model mentioned above. The historical health indicator function is similar to the corresponding historical health indicator function obtained by using the regression model according to the sensor data of each training cycle as indicated in FIG. 4. In the historical health indicator model, a possible trend interval corresponding to the current-health indicator function f, such as the interval surrounded by boundaries s1 and s2, is defined, wherein the boundary s1 is the boundary by adding a specific value to the slope of the current-health indicator function f, and the boundary s2 is the boundary by deducting another specific value form the slope of the current-health indicator function f.

If at least one historical health indicator function exists in the possible trend interval, the historical data-based prediction module obtains a historical fitness function formed by fitting one historical health indicator function in the possible trend interval and obtains the second predicted remaining lifetime by the historical fitness function. For example, suppose the historical health indicator functions f2 and f3 exist in the possible trend interval defined by the boundaries s1 and s2. Then, a historical fitness function f' can be obtained by fitting the historical health indicator functions f2 and f3 and the second predicted remaining lifetime can be obtained by the historical fitness function f'. The historical fitness function f' is used to predict a time point at which a predicted health indicator will exceed a threshold TH in the future. The predicted time point is a failure time point of the component of equipment. The difference between the failure time point and the current time point is the second predicted remaining lifetime. For example, the second predicted remaining lifetime is the time difference T2 (T2=t3−t1) between the time (corresponding to the time point t3) of the run re' at which the value of the historical fitness function f' reaches the threshold TH and the time (corresponding to the time point t1) of the current run r5.

An example of obtaining the second prediction confidence is exemplified below. If at least one historical health indicator function exists in the possible trend interval, the value of the second prediction confidence is a first value (such as 1); otherwise, the value of the second prediction confidence is a second value (such as 0). When the value of the second prediction confidence is the first value, the confidence module 110 uses the second predicted remaining lifetime as the final predicted remaining lifetime of the component of equipment. When the value of the second prediction confidence is the second value, the confidence module 110 uses the first predicted remaining lifetime as the final predicted remaining lifetime of the component of equipment.

In another embodiment, the second prediction confidence can set to be related to the similarity between the historical health indicator model and the current-health indicator function. For example, the second prediction confidence can be obtained by calculating the distance between the historical health indicator model and the current-health indicator function. Let FIG. 5 be taken for example. The larger the similarity between the historical health indicator model composed of the historical health indicator functions f1~f5 and the current-health indicator function f, the larger the value of the second prediction confidence. Or, the larger the similarity between the historical health indicator function f2 and f3 in the possible trend interval defined by the boundaries s1 and s2 and the current-health indicator function f, the larger the value of the second prediction confidence. In the confidence module 110, a combined coefficient is obtained by normalizing the first prediction confidence and the second prediction confidence, and a weighted average of the first predicted remaining lifetime and the second predicted remaining lifetime is calculated according to the combined coefficient to generate a final predicted remaining lifetime.

In another embodiment, the confidence module 110 determines whether the first prediction confidence or the second prediction confidence is larger than a confidence threshold, and further uses the one of the first predicted remaining lifetime and the second predicted remaining lifetime corresponding to the first prediction confidence or the second prediction confidence that is larger than the confidence threshold as the final predicted remaining lifetime.

Figure 6:
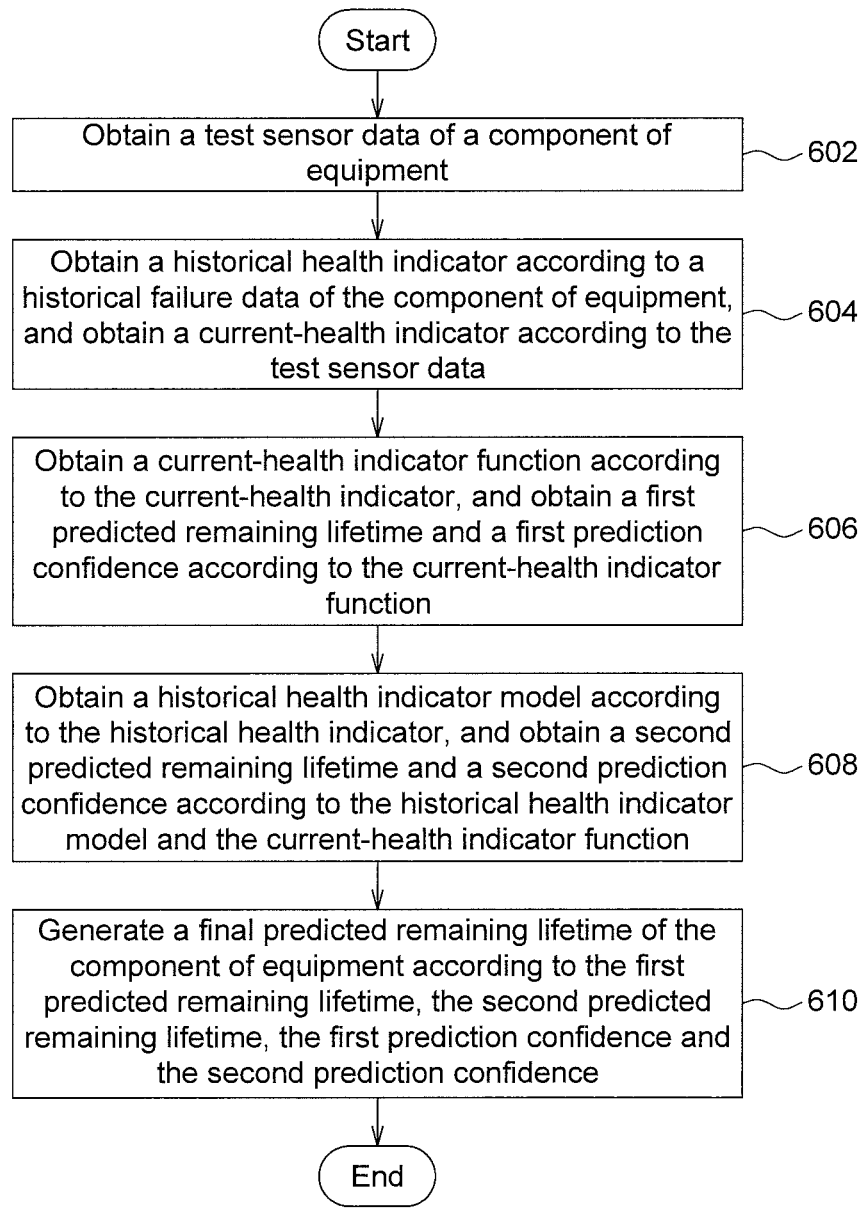
FIG. 6 is a flowchart of method for predicting the remaining lifetime of the component of equipment according to an embodiment of the disclosure.

The present disclosure further provides a method for predicting the remaining lifetime of the component of equipment. Referring to FIG. 6, a flowchart of method for predicting the remaining lifetime of the component of equipment according to an embodiment of the disclosure is shown. Firstly, the method begins at step 602, in which a test sensor data of a component of equipment is obtained. Then, the method proceeds to step 604, a historical health indicator is obtained according to a historical failure data of the component of equipment, and a current-health indicator is obtained according to the test sensor data. Then, the method proceeds to step 606, a current-health indicator function is obtained according to the current-health indicator, and a first predicted remaining lifetime and a first prediction confidence are obtained according to the current-health indicator function.

Then, the method proceeds to step 608, a historical health indicator model, including one historical health indicator function, is obtained according to the historical health indicator. A second predicted remaining lifetime is obtained according to the historical health indicator model and the current-health indicator function. A second prediction confidence is obtained according to the relationship between the historical health indicator model and the current-health indicator function. Then, the method proceeds to step 610, a final predicted remaining lifetime of the component of equipment is generated according to the first predicted remaining lifetime, the second predicted remaining lifetime, the first prediction confidence and the second prediction confidence.

A comparison is made between the system and method for predicting the remaining lifetime of a component of equipment of the present embodiment and the method for predicting the remaining lifetime of the component of equipment which uses only the aging trend of current data or the historical failure data. The method for predicting the component of equipment which uses the aging trend of current data may generate an unsatisfactory prediction result due to insufficient data amount or low stability. The method for predicting the component of equipment which uses the historical failure data may generate an unsatisfactory prediction result if a current failure mode cannot be found in the historical failure data. The method for predicting the remaining lifetime of the component of equipment of the present disclosure uses the prediction model combining both the aging trend of the current data and the historical failure data, and determines the final predicted remaining lifetime through dynamic adjusting, hence significantly improving the prediction result. Through increasing the accuracy of the prediction of the final predicted remaining lifetime of the component of equipment, the best timing for maintaining or replacing the component of equipment can be determined, and both unexpected downtime and maintenance frequency of the equipment can be reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for predicting the remaining lifetime of a component of equipment, comprising:
    a data module used for obtaining a test sensor data of the component of equipment;
    a feature module used for obtaining a historical health indicator according to a historical failure data of the component of equipment, and obtaining a current-health indicator according to the test sensor data, wherein the historical failure data of the component of equipment corresponds to a life cycle of the component of equipment;
    a current data-based prediction module used for obtaining a current-health indicator function according to the current-health indicator, and obtaining a first predicted remaining lifetime and a first prediction confidence according to the current-health indicator function;
    a historical data-based prediction module used for obtaining a historical health indicator model, comprising at least one historical health indicator function, according to the historical health indicator, obtaining a second predicted remaining lifetime according to the historical health indicator model and the current-health indicator function, and obtaining a second prediction confidence according to a relationship between the historical health indicator model and the current-health indicator function; and
    a confidence module used for generating a final predicted remaining lifetime of the component of equipment according to the first predicted remaining lifetime, the second predicted remaining lifetime, the first prediction confidence and the second prediction confidence;
    wherein each of the data module, the feature module, the current data-based prediction module, the historical data-based prediction module, and the confidence module is implemented by a circuit.

2. The prediction system according to claim 1, wherein the current-health indicator function predicts a time point at which a predicted health indicator will exceed a threshold in the future, the predicted time point is a failure time point of the component of equipment, and the difference between the failure time point and a current time point is the first predicted remaining lifetime.

3. The prediction system according to claim 1, wherein the historical failure data comprises a historical sensor data of at least one training cycle, the historical sensor data of each training cycle corresponds to the at least one historical health indicator function, in the historical health indicator model, a possible trend interval corresponding to the current-health indicator function is defined, the historical data-based prediction module obtains a historical fitness function by fitting the at least one historical health indicator function in the possible trend interval and obtains the second predicted remaining lifetime according to the historical fitness function.

4. The prediction system according to claim 3, wherein the historical fitness function predicts a time point at which a predicted health indicator will exceed a threshold, the predicted time point is a failure time point of the component of equipment, and a difference between the failure time point and a current time point is the second predicted remaining lifetime.

5. The prediction system according to claim 3, wherein the at least one historical health indicator function exists in the possible trend interval, a value of the second prediction confidence is a first value, and the confidence module uses the second predicted remaining lifetime as the final predicted remaining lifetime of the component of equipment.

6. The prediction system according to claim 5, wherein the at least one historical health indicator function does not exist in the possible trend interval, a value of the second prediction confidence is a second value, and the confidence module uses the first predicted remaining lifetime as the final predicted remaining lifetime of the component of equipment.

7. The prediction system according to claim 1, wherein the relationship of the second prediction confidence is obtained according to a similarity between the historical health indicator model and the current-health indicator function.

8. The prediction system according to claim 1, wherein the confidence module calculates a combined coefficient by normalizing the first prediction confidence and the second prediction confidence and calculates a weighting average of the first predicted remaining lifetime and the second predicted remaining lifetime according to the combined coefficient to generate the final predicted remaining lifetime.

9. The prediction system according to claim 1, wherein the current data-based prediction module obtains the current-health indicator function by using a regression model according to the test sensor data, and a regression error corresponding to the regression model is used as the first prediction confidence.

10. The prediction system according to claim 1, wherein in the confidence module determines whether the first prediction confidence or the second prediction confidence exceeds a confidence threshold, and uses the one of the first predicted remaining lifetime and the second predicted remaining lifetime corresponding to the first prediction confidence or the second prediction confidence that exceeds the confidence threshold as the final predicted remaining lifetime.

11. A method for predicting a remaining lifetime of a component of equipment, comprising:
obtaining a test sensor data of the component of equipment;
obtaining a historical health indicator according to a historical failure data of the component of equipment, and obtaining a current-health indicator according to the test sensor data, wherein the historical failure data of the component of equipment corresponds to a life cycle of the component of equipment;
obtaining a current-health indicator function according to the current-health indicator, and obtaining a first predicted remaining lifetime and a first prediction confidence according to the current-health indicator function;
obtaining a historical health indicator model, comprising at least one historical health indicator function, according to the historical health indicator, obtaining a second predicted remaining lifetime according to the historical health indicator model and the current-health indicator function, and obtaining a second prediction confidence according to a relationship between the historical health indicator model and the current-health indicator function; and
generating a final predicted remaining lifetime of the component of equipment according to the first predicted remaining lifetime, the second predicted remaining lifetime, the first prediction confidence and the second prediction confidence.

12. The prediction method according to claim 11, wherein the current-health indicator function predicts a time point at which a predicted health indicator will exceed a threshold in the future, the predicted time point is a failure time point of the component of equipment, and a difference between the failure time point and a current time point is the first predicted remaining lifetime.

13. The prediction method according to claim 11, wherein the historical failure data comprises a historical sensor data of at least one training cycle, the historical sensor data of each training cycle corresponds to the at least one historical health indicator function, in the historical health indicator model, a possible trend interval corresponding to the current-health indicator function is defined, a historical fitness function is obtained by fitting the at least one historical health indicator function in the possible trend interval and the second predicted remaining lifetime is obtained according to the historical fitness function.

14. The prediction method according to claim 13, wherein the historical fitness function predicts a time point at which a predicted health indicator will exceed a threshold in the future, the predicted time point is a failure time point of the component of equipment, and the difference between the failure time point and a current time point is the second predicted remaining lifetime.

15. The prediction method according to claim 13, wherein the at least one historical health indicator function exists in the possible trend interval, a value of the second prediction confidence is a first value the second predicted remaining lifetime is used as the final predicted remaining lifetime of the component of equipment.

16. The prediction method according to claim 15, wherein the at least one historical health indicator function does not exist in the possible trend interval, a value of the second prediction confidence is a second value, and the first predicted remaining lifetime is used as the final predicted remaining lifetime of the component of equipment.

17. The prediction method according to claim 11, wherein the relationship of the second prediction confidence is obtained according to a similarity between the historical health indicator model and the current-health indicator function.

18. The prediction method according to claim 11, wherein in the step of generating the final predicted remaining lifetime, a combined coefficient is calculated by normalizing the first prediction confidence and the second prediction confidence, and a weighting average of the first predicted remaining lifetime and the second predicted remaining lifetime is calculated according to the combined coefficient to generate the final predicted remaining lifetime.

19. The prediction method according to claim 11, wherein in the step of obtaining the current-health indicator function, the current-health indicator function is obtained by using a regression model according to the test sensor data, and a regression error corresponding to the regression model is used as the first prediction confidence.

20. The prediction method according to claim 11, wherein in the step of obtaining the final predicted remaining lifetime, whether the first prediction confidence or the second prediction confidence exceeds a confidence threshold is determined, and the one of the first predicted remaining lifetime and the second predicted remaining lifetime corresponding to the first prediction confidence or the second prediction confidence that exceeds the confidence threshold is used as the final predicted remaining lifetime.

* * * * *